US006201399B1

(12) United States Patent
Sticha et al.

(10) Patent No.: US 6,201,399 B1
(45) Date of Patent: Mar. 13, 2001

(54) AUTOMATIC CALIBRATION SYSTEM FOR APPARATUS FOR MEASURING VARIATIONS IN THICKNESS OF ELEONGATED SAMPLES OF THIN PLASTIC FILM

(76) Inventors: Neil A. Sticha; Kevin D. Edmunds, both of 303 21st St., Newport, MN (US) 55055

( * ) Notice: Subject to any disclaimer, the term of this patent is extended or adjusted under 35 U.S.C. 154(b) by 0 days.

(21) Appl. No.: 09/203,238

(22) Filed: Dec. 1, 1998

Related U.S. Application Data
(60) Provisional application No. 60/067,171, filed on Dec. 1, 1997.

(51) Int. Cl.[7] .................................................. G01N 27/22
(52) U.S. Cl. ........................................... 324/663; 324/671
(58) Field of Search ........................... 326/663, 671–673, 326/679, 680, 684, 685; 33/501.02, 501.03, 501.04; 73/1.81

(56) References Cited

U.S. PATENT DOCUMENTS

| | | | |
|---|---|---|---|
| 3,471,780 | 10/1969 | Beddows | 324/671 |
| 3,764,899 | * 10/1973 | Peterson et al. | 324/671 |
| 4,071,820 | * 1/1978 | Mushinsky | 324/671 |
| 4,208,625 | * 6/1980 | Piso | 324/671 |
| 4,564,810 | * 1/1986 | Geithman et al. | 324/230 |
| 4,823,590 | * 4/1989 | Kniest et al. | 73/1.81 |
| 4,910,453 | * 3/1990 | Abbe et al. | 324/663 |
| 4,952,882 | * 8/1990 | Mayer et al. | 324/670 |
| 4,955,225 | * 9/1990 | Kneist et al. | 73/1.81 |
| 5,101,166 | 3/1992 | Oestreich et al. | 324/671 |
| 5,138,268 | * 8/1992 | Mulkey et al. | 324/671 |
| 5,528,153 | * 6/1996 | Taylor et al. | 324/671 |
| 5,691,648 | * 11/1997 | Cheng | 324/716 |
| 5,719,495 | * 2/1998 | Moslehi | 324/158.1 |
| 5,793,217 | 8/1998 | Herbst, Jr. | 324/690 |

\* cited by examiner

*Primary Examiner*—Safet Metjahic
*Assistant Examiner*—Vincent Q. Nguyen

(57) ABSTRACT

A capacitance gauge for measuring changes in the thickness of dielectric film, such as plastic film, is automatically calibrated by utilizing a direct-measurement sensor method or a contact-type sensor method alongside the capacitance sensor assembly. The direct-measurement sensor and the capacitance sensor measure the same point on the film sample, and the capacitive calibration reading is correlated to the direct-measurement sensor reading to automatically calibrate the capacitive sensor. An improved film transport assembly for serially examining plastic film material which eliminates errors in thickness measurement location and eliminates variation in distance between individual sensor readings, while at the same time allowing accurate positioning of the film in the sensors. Also, electronics which provide four modes of operation which include operating both the direct-measurement sensor and the capacitance sensor independently, or integrated for automatic calibration of the capacitance sensor, or simultaneously as a dual-sensor thickness measurement system.

14 Claims, 3 Drawing Sheets

AUTOMATIC CALIBRATION SYSTEM FOR APPARATUS FOR MEASURING VARIATIONS IN THICKNESS OF ELEONGATED SAMPLES OF THIN PLASTIC FILM

This appln claims the benefit of U.S. Provisional No. 60/067,171 filed Dec. 1, 1997.

TECHNICAL FIELD OF THE INVENTION

This invention relates generally to capacitance measuring systems and apparatus for capacitively determining the thickness of dielectric material, such as plastic film. The present invention relates to use of a direct-measurement apparatus for automatic calibration of a capacitive-type thickness measurement apparatus capable of measuring minute variations in the thickness of thin plastic films.

BACKGROUND ART

In the field with which our invention is concerned, the use of capacitive measuring systems for measuring film thickness is known in the art. Also, the use of direct-measurement and contact-type measuring systems for measuring film thickness is known in the art.

One form known in the art is disclosed in U.S. Pat. No. 3,764,899, issued Oct. 9, 1973. This patent measures film thickness by passing the film through a capacitance sensor, wherein variations in film thickness are sensed as dielectric thickness variations between the capacitance members, and are detected as variations in a signal which is applied to the capacitance members.

Another form of capacitance measuring device is disclosed in U.S. Pat. No. 4,952,882, issued Aug. 28, 1990, which was submitted as an improvement in the construction of the capacitance sensor disclosed in the foregoing United States patent. This capacitance sensor assembly also measures changes in thickness of a dielectric film, such as plastic film, where the sensor components are constructed from materials having low coefficients of linear temperature expansion, resulting in a claimed measurement device which provides low measurement errors resulting from temperature effects on material expansion and dielectric changes.

The present invention is an improvement in the construction and calibration of the capacitive measuring system and related transport for serially examining plastic film material.

Measurement instruments of the type for which the invention finds utility are typically used to measure plastic film thicknesses in the range of 0.001–0.100 inch. Measurement accuracy, of both the film thickness and of thickness measurement locations, should be maintained over a range of ambient temperatures and relative humidities which are found in the typical environment where such instruments are used. A problem in prior art measurement devices has been the inability to maintain accurate measurements of film thickness and thickness measurement location over a range of ambient temperature and humidity changes. A second problem in prior art measurement devices, since the capacitive measurement technique is an indirect-measurement technique, has been the requirement to recalibrate the device for the many different types of plastic film products manufactured in a typical plant environment. Prior art devices must be recalibrated for each film type, with its different dielectric properties, to provide accurate absolute thickness information.

SUMMARY OF THE INVENTION

It is therefore an object of our invention to provide a direct-measurement sensor assembly alongside an improved capacitance sensor assembly which allows automatic calibration of the capacitance sensor using a direct-measurement method or a contact-type method. Direct measurement apparatus' include, but are not limited to, contact-type sensor assemblies (such as mechanical, electro-mechanical, linear variable displacement transducers, etc.) or non-contact type sensor assemblies (such as laser, air-gauge, infrared, nuclear, beta, x-ray, etc.) Our invention accomplishes its intended result, automatically, without the requirement of attempting to store calibration information in the memory of an embedded microprocessor or an external computer system.

Current methods of memory storage of calibration information in capacitance film thickness gauges are unreliable because capacitance changes due to ambient environment changes affect primary sensor readings over typical changes in ambient environment conditions. Also, a second problem occurs when an operator changes, intentionally or unintentionally, the gap between the upper and lower electrodes which make up the capacitance sensor, rendering the stored calibration information inaccurate. A third problem occurs when additive and/or base-material changes occur in the film types resulting in changed dielectric properties of the material, rendering currently stored calibration information inaccurate.

Our invention accomplishes its intended result, automatically, without the requirement of utilizing exotic materials in sensor component construction as was required in the aforementioned prior art patent, and without the need to store calibration information in the memory of the capacitance film thickness device.

Integral to our invention is an improved film transport assembly for serially examining plastic film material which eliminates errors in thickness measurement location and eliminates variation in distance between individual sensor readings, while at the same time allowing accurate positioning of the film in the sensor. The invention utilizes a variable-speed, servo-controlled motor, position feedback device and motor controller assembly to accomplish these improvements. This motor control assembly is capable of starting, stopping, and accurate positioning of the film transport and film sample.

Accurate positioning of the film in the direct-measurement or contact-type and capacitance-type sensors is important because our invention first measures a specific point on the film sample with the contact-type sensor for calibration purposes, then the invention automatically moves the film sample such that the same calibration point on the film sample is positioned directly between the upper and lower capacitance sensor electrodes where the capacitive calibration reading is correlated to the contact-type calibration reading before the sample is run.

It is a second object of our invention to be capable of four modes of operation: 1) As described above, the direct-measurement sensor assembly allows automatic calibration of the capacitance sensor with thickness profile data measured using the capacitance sensor; 2) the capacitance sensor can be run as a stand-alone thickness profile data measuring system; 3) the direct-measurement sensor can be run as a stand-alone thickness profile data measuring system, and 4) running the capacitance sensor and the direct-measurement sensor simultaneously as a dual-sensor thickness profile data measuring system. The fourth mode of operation is useful, for example, in the measurement of embossed films where the direct-measurement sensor can measure peak-to-peak thickness (height) of the embossed pattern, and the capacitance sensor can measure the equivalent unembossed thickness, simultaneously.

An additional advantage of our invention is its ability to measure thickness profile information on materials where the capacitance sensor technology has weaknesses, or is not effective. Such materials include, but are not limited to, monolayer plastic films, coextruded and laminated multi-layer plastic films, embossed materials, metallized films, heavily-colored films, paper, and like sheet materials.

DESCRIPTION OF PREFERRED EMBODIMENT

Figure 1:
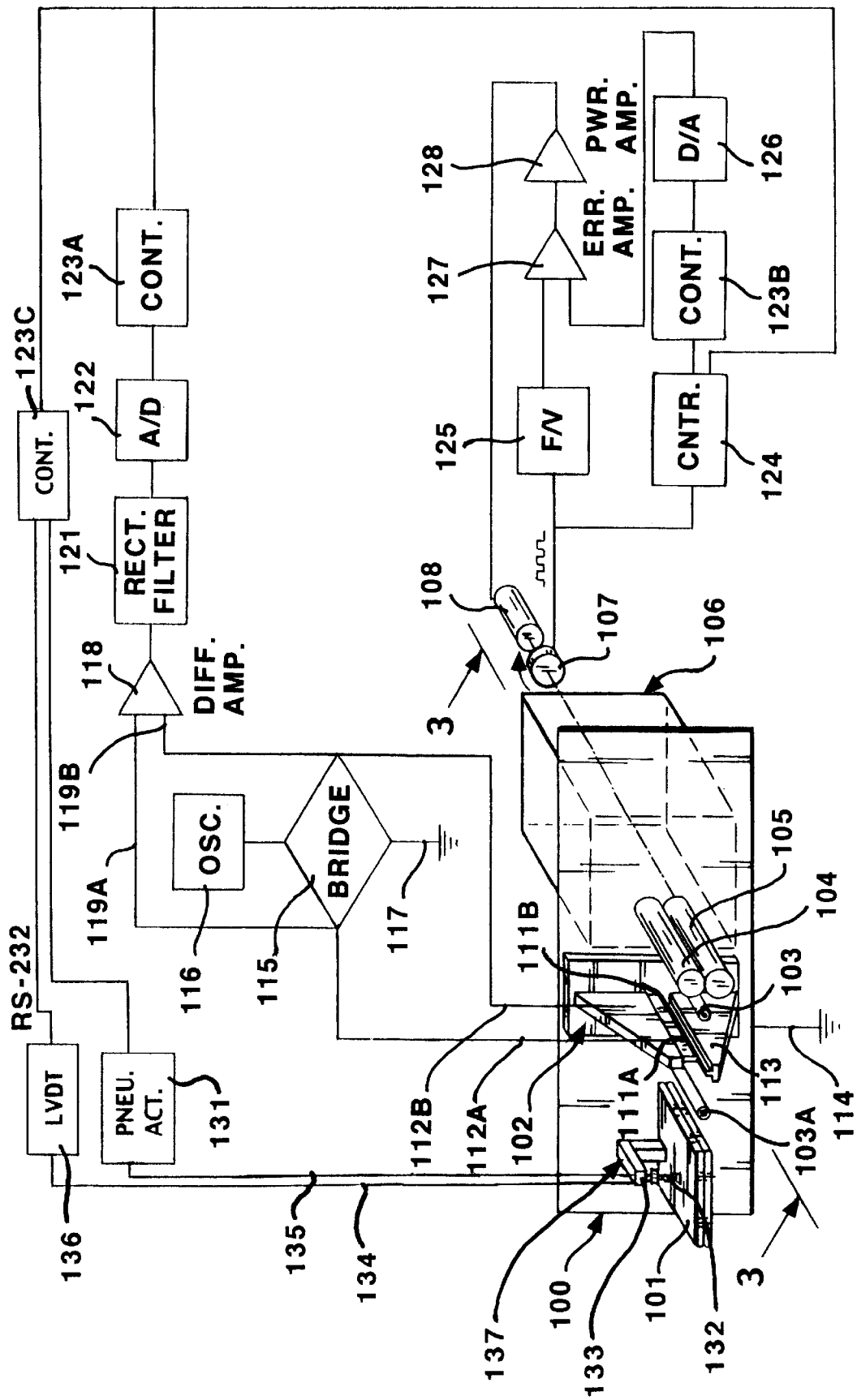
FIG. 1 is a functional schematic diagram of apparatus embodying the principles of our invention.

Referring now to the drawings, the pictorial diagrammatic representation in FIG. 1 includes a panel 100 upon which various elements of the system may conveniently be mounted, although, only substantially the mechanical portions are shown in pictorial illustration. Panel 100 forms a support for the forwardly extending film support plate 101, electrode assembly 102, guide bars 103 and 103A, adjustable idle roller 104, drive roller 105, and forms a support for the backwardly extending film transport carriage 106, drive roller position feedback device 107, and drive motor 108.

Panel 100 also forms the support for the forwardly extending contact-type sensor assembly 137 including film support plate 101, sensor mounting arm 133, and contact sensor 132.

Figure 2:
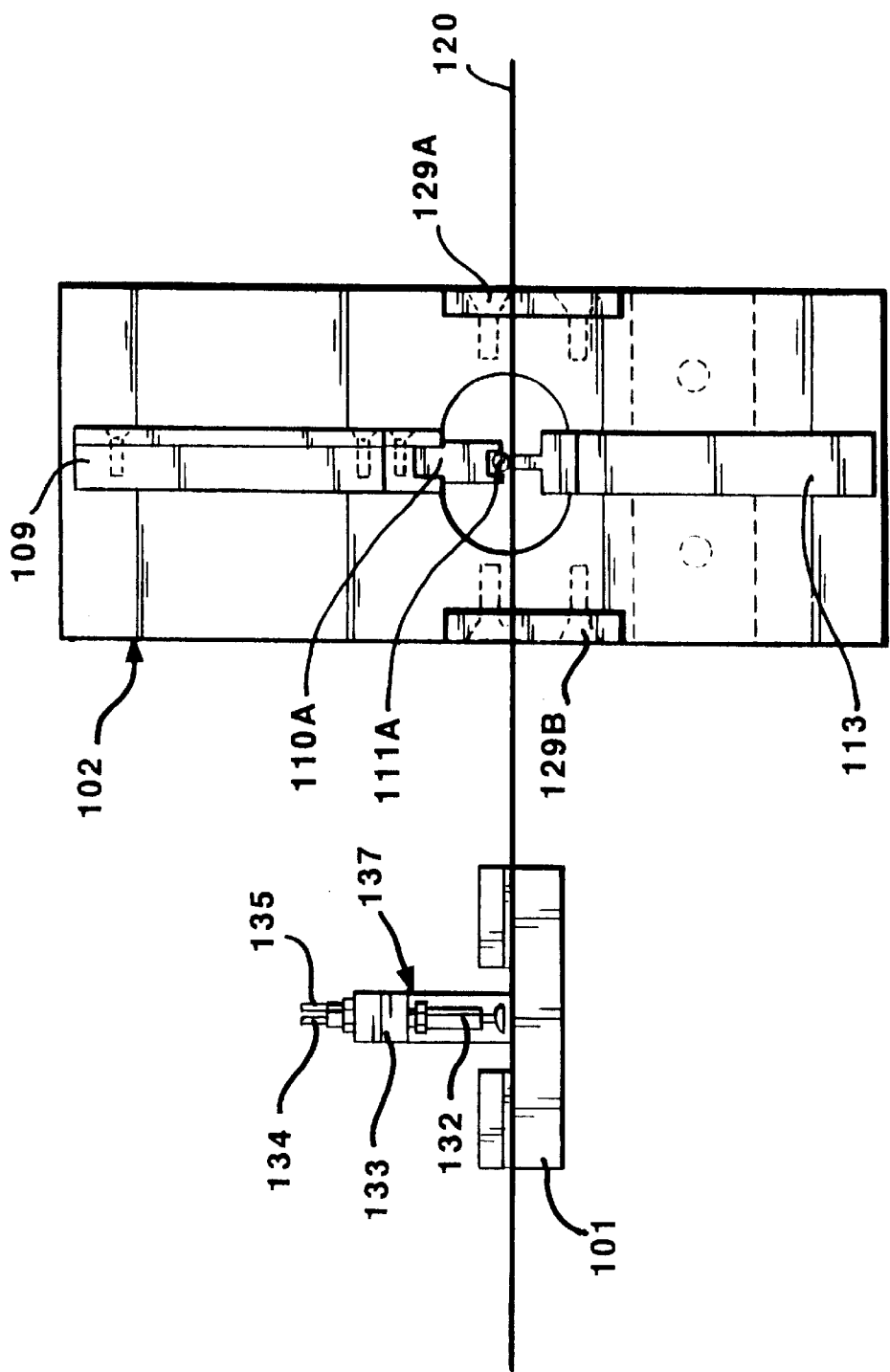
FIG. 2 is an enlarged front elevation of the contact-type and capacitance sensor assemblies shown as a fragmentary portion of FIG. 1.

As shown in FIG. 2, an elongated strip, or web of plastic material 120 is passed over the top of film support plate 101, intermediate guide bars 103 and 103A, through the capacitance electrode assembly 102 and intermediate rollers 104 and 105.

Also as shown in the FIGS. 1 and 2 drawing, contact-type sensor assembly 137 is comprised of a sensor mounting arm 133 which is designed to hold contact sensor 132, which is mounted directly above film support plate 101. Film support plate 101 acts as the stand anvil of the contact measurement device. A suitable conductor 134 and air actuation line 135 is shown connected to the contact sensor assembly.

Capacitive electrode assembly 102 is comprised of a top portion 109 which is adapted to receive and hold two insulated inserts 110A (and 110B) which, in turn, are each provided with a groove at its lower portion that is adapted to receive and hold two longitudinally elongated electrodes 111A (and 111B) of substantially circular cross section. A suitable conducter 112A and 112B (not shown) is connected to each electrode. Another electrode, which may be vertically adjustable upon panel 100, is comprised of current conducting material and is indicated by reference character 113. The other electrode, 113, is provided with a longitudinally elongated raised portion at its center that is adapted to be vertically adjustably disposed in parallel with and substantially underneath electrodes 111A (and 111B) so as to define, therebetween, a generally uniform gap for sidably receiving the elongated film of dielectric or plastic material 120, the thickness and variations thereof of which is to be determined. The film material 120 is only allowed to pass under the front of two electrodes, and is prevented from passing under the second reference electrode by standoffs 129A and 129B mounted to the sensor assembly. Capacitive Electrode Assembly 102 is described in U.S. patent application Ser. No. 60/037,614 which is incorporated herein by reference.

Figure 3:
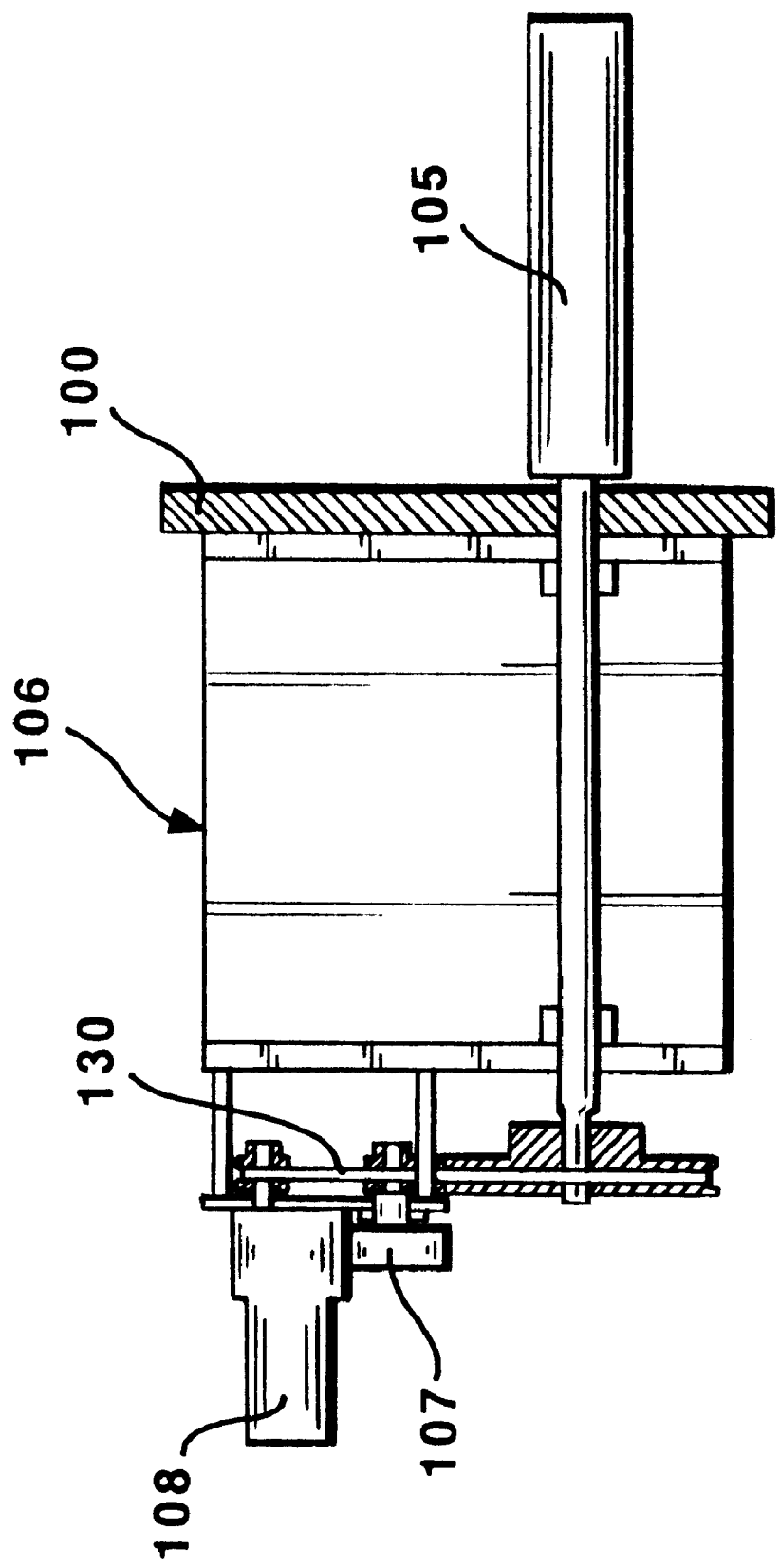
FIG. 3 is a sectional, side elevation of the film transport assembly shown as a fragmentary portion of FIG. 1 taken along line 3—3 of FIG. 1.

As shown in enlarged FIG. 3 of the drawings, the film transport assembly is comprised of film transport carriage 106, which is mounted on panel 100, and is arranged to support drive roller 105, drive roller position feedback device 107, and drive motor 108. In the specific form illustrated, the drive roller 105, drive roller position feedback device 107, and drive motor 108 are connected and driven by a common drive belt 130.

Referring again to FIG. 1, one of the electrodes 113 of electrode assembly 102 is shown connected to ground through conductor 114. The other two longitudinally elongated electrodes are shown having conductors 112A and 112B connected to bridge circuit 115. An oscillator 116 is shown connected to bridge circuit 115 which provides excitation for the bridge, and the remaining bridge terminal is connected to ground through conductor 117. The two side terminals of bridge circuit 115 are connected to differential amplifier 118 through conductors 119A and 119B.

The differential amplifier 118 amplifies any difference between the front sensing electrode and the second reference electrode caused by the addition of the film sample 120 between the front sensing electrodes. The amplified output is rectified & filtered in the rectifier/filter circuit 121 to convert the alternating current difference signal to a direct current signal, and is then converted from an analog signal to a digital signal in the A/D converter 122 and is then sent to the microcontroller 123A for data collection and analysis.

Upon a sample run start command from microcontroller 123C, a pneumatic actuator assembly 131 actuates the contact sensor 132 via pneumatic air line 135. The thickness value output from the linear variable displacement transducer 136 is then sent via RS-232 data format to the microcontroller 123C for data collection and analysis.

Output pulses from the drive roller position feedback device 107 are counted by counter 124 to monitor position travelled, and are also sent to the frequency-to-voltage converter 125. From counter 124 the position information is transmitted to the microcontroller 123B.

Microcontrollers 123A, 123B and 123C are a single microprocessor such as to allow collection of thickness readings from the contact sensor 132 and the capacitance electrode assembly 102; perform automatic calibration of the capacitance electrode assembly 102 by the contact sensor 132; and control the transport assembly of FIG. 3.

Setpoint speed information is entered into the microcontroller 123B by the operator, and is converted by the digital-to-analog converter 126 and sent to the input side of error amplifier 127, where it is compared to the actual speed signal from the frequency to voltage converter 125. The error amplifier 127 sends a signal to the power amplifier 128 which increases or decreases voltage to the drive motor 108 until set point speed equals actual speed. The system continually monitors and maintains correct drive motor speed.

When the operator starts the sample run the start command is entered into the microcontroller 123B which notes the position of the film under the contact-type measuring head. Microcontroller 123C sends an actuation signal to the pneumatic actuation device 131 which takes a contact-type thickness reading of the film material with the contact sensor 132. Microcontroller 123B then automatically advances the film by starting drive motor 108, wile constantly recording and tracking film position, automatically positions the same film location measured by the contact sensor between capacitance sensor electrodes 111A and 113 of the electrode assembly 102. Now microcontroller 123A and associated circuitry measures the capacitance of the film material at that same point, and automatically calibrates the thickness of that capacitive value to the thickness calibration reading taken by the contact sensor 132. Next, the film drive motor 108 automatically starts and records the film thickness profile information of the entire web sample (with thickness calibration based on readings taken by the contact sensor 132) using the capacitance electrode assembly 102.

The components utilized in the system disclosed as an illustrative embodiment of our invention may readily be determined by those skilled in the art.

The present invention may be embodied in other specific forms without departing from the spirit or essential attributes thereof, and it is therefore desired that the present embodiment be considered in all respects as illustrative and not restrictive.

What is claimed is:

1. An apparatus for measuring changes in thickness of a dielectric film comprising:
    a) a contact sensor for engaging a dielectric film and providing a direct measurement of the thickness of the dielectric film and a thickness value output relating to the direct measured thickness,
    b) a non-contact electrode assembly for measuring changes in the thickness of the dielectric film without engaging the dielectric film,
    c) means for mounting the contact sensor adjacent to the non-contact electrode assembly,
    d) means for automatically calibrating the non-contact electrode assembly using the thickness value output of the contact sensor for a reference thickness used to provide data concerning changes in thickness of the dielectric film as measured by the non-contact assembly.

2. The apparatus of claim 1 wherein: the film transport assembly comprises rollers for moving the film, an amplifier and variable speed motor assembly to drive the rollers for advancing the film adjacent the contact sensor between the first and second electrodes, a position feedback device to monitor motor speed and position of the rollers, and a controller to monitor and main the speed of the motor and stop and start the motor to position the film relative to the first and second electrodes.

3. The apparatus of claim 1 wherein: the contact sensor includes a film sensing member, and means for moving the film sensing member into engagement with the film.

4. The apparatus of claim 3 wherein: the means mounting the contact sensor adjacent the non-contact electrode assembly includes a film support plate having a top surface for supporting the film, and an arm connected to the plate supporting the contact sensor adjacent said top surface of the plate, said film sensing member being movable into engagement with the film on the surface of the plate.

5. The apparatus of claim 1 wherein: the non-contact electrode assembly comprises:
    a) a first electrode,
    b) a second electrode,
    c) a third electrode,
    d) said second and third electrodes being linearly aligned with each other and laterally spaced from each other and aligned with and spaced from the first electrode,
    e) guide means for preventing the film from passing between the first and third electrodes and allowing the film to pass between the first and second electrodes, and
    f) means electrically coupled to the second and third electrodes to cancel imbalances in the electrical signals sensed between the first and second electrodes with electrical signals sensed between the first and third electrodes caused by temperature, humidity or other fluctuations.

6. The apparatus in claim 5 including: means for adjusting the locations of the second and third electrodes relative, to the first electrode to adjust the space between the first electrode and the second and third electrodes.

7. The apparatus in claim 5 wherein: the second and third electrodes are linear members having substantially the same lengths.

8. The apparatus of claim 5 wherein: the linear members are cylindrical electrical conductors.

9. The apparatus of claim 5 wherein: the linear members are anally aligned and have adjacent spaced ends.

10. The apparatus of claim 5 wherein: the guide means comprise a pair of plates for preventing the film from passing between the first electrode and third electrode.

11. An apparatus for measuring changes in thickness of a film comprising:
    a) a first sensor for providing a direct measurement of the thickness of a film by contacting the film and generating reference thickness information relating to said direct measurement,
    b) a second sensor for measuring changes in the thickness of the film without contacting the film,
    c) means for moving the film relative to the first and second sensors, and
    d) means for automatically calibrating the second sensor using the reference thickness information of the first sensor as a film thickness reference to provide data concerning changes in thickness of the film as measured by the second sensor.

12. The apparatus of claim 11 wherein: the first sensor includes a film sensing member, and means operable to move the sensing member into engagement with the film.

13. The apparatus of claim 11 wherein: the second sensor comprises a first electrode, a second electrode, a third electrode, said second and third electrodes being linearly aligned with each other and laterally spaced from each other and aligned with and spaced from the first electrode, and means electrically coupled to the second and third electrodes to cancel imbalances in electrical signals sensed between the first and second electrodes with electrical signals between the first and third electrodes.

14. The apparatus of claim 11 wherein: the means for moving the film comprises rollers for moving the film, an amplifier, and a motor to drive the rollers for moving the film relative to the first and second sensors.

* * * * *